United States Patent
Oneda

(10) Patent No.: US 8,327,452 B2
(45) Date of Patent: Dec. 4, 2012

(54) PROGRAM OBFUSCATION APPARATUS, PROGRAM OBFUSCATION METHOD AND COMPUTER READABLE MEDIUM

(75) Inventor: Yuichi Oneda, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 643 days.

(21) Appl. No.: 12/543,524

(22) Filed: Aug. 19, 2009

(65) Prior Publication Data
US 2010/0218257 A1 Aug. 26, 2010

(30) Foreign Application Priority Data

Feb. 20, 2009 (JP) ................. 2009-037526

(51) Int. Cl.
*G06F 21/00* (2006.01)
(52) U.S. Cl. .......................... 726/26; 713/190
(58) Field of Classification Search ............... 726/26; 713/190

See application file for complete search history.

(56) References Cited

U.S. PATENT DOCUMENTS

| 6,668,325 B1 * | 12/2003 | Collberg et al. | 713/194 |
| 7,322,045 B2 * | 1/2008 | Kiddy | 726/26 |
| 7,430,670 B1 * | 9/2008 | Horning et al. | 713/190 |

FOREIGN PATENT DOCUMENTS

| JP | 2003-337629 A | 11/2003 |
| JP | 2004-185064 A | 7/2004 |
| JP | 2004-192068 A | 7/2004 |
| JP | 2005-049925 A | 2/2005 |

OTHER PUBLICATIONS

Srinivasan Chandrasekharan, Evaluation of the Efficacy of Control Flow Obfuscation Against Profiling and Intelligent Static Attacks pp. 1-26 Dec. 2003, University of Arizona.*
Giger Marie Myles, Softwaer Theft Detection Through Program Identification, pp. 1-351 May 2006 The University of Arizona.*
Christian Collberg, et al; "Manufacturing Cheap, Resilient, and Stealthy Opaque Constructs", Department of Computer Science, University of Auckland, New Zealand; Proceedings of the 25th ACM Symposium on Principles of Programming Languages; pp. 184-196; 1998.

* cited by examiner

*Primary Examiner* — William Powers
*Assistant Examiner* — Ghodrat Jamshidi
(74) *Attorney, Agent, or Firm* — Sughrue Mion, PLLC

(57) ABSTRACT

A program obfuscation method includes: detecting a loop from an obfuscation target program; adding a conditional expression to the obfuscation target program at a preceding stage of the loop, wherein the conditional expression is neither permanently invalid nor permanently valid and adding a flow in which (a) when a logical value of the conditional expression is false, processing of the obfuscation target program proceeds to a start of the loop, and (b) when the logical value of the conditional expression is true, the processing executes a set of executable statements equivalent to a set of executable statements which are ones from the first executable statement to a middle executable statement among a plurality of executable statements in the loop, and then the processing proceeds to an executable statement subsequent to the middle executable statement in the loop.

6 Claims, 16 Drawing Sheets

PROGRAM OBFUSCATION APPARATUS, PROGRAM OBFUSCATION METHOD AND COMPUTER READABLE MEDIUM

CROSS-REFERENCE TO RELATED APPLICATIONS

This application is based on and claims priority under 35 USC 119 from Japanese Patent Application No. 2009-037526 filed on Feb. 20, 2009.

BACKGROUND

1. Technical Field

The present invention relates to a program obfuscation apparatus, a program obfuscation method and a computer readable medium.

2. Related Art

In order to protect a program from malicious reverse engineering, various program obfuscation techniques have been proposed. The term "obfuscation" refers to a technique for converting a program into a complicated program, thereby increasing program analysis cost.

For example, a method for preventing program decompilation (which will be hereinafter referred to as a "decompilation prevention method") is a method for converting a program into a program semantically equivalent but having difficulty in being decompiled (e.g., a program that causes abnormal termination of a decompiler, and/or an erroneous output result of a decompiler).

SUMMARY

According to an aspect of the invention, a computer readable medium storing a program causing a computer to execute a process for obfuscating a program, the process comprising: detecting a loop from an obfuscation target program; adding a conditional expression to the obfuscation target program at a preceding stage of the loop, wherein the conditional expression is neither permanently invalid nor permanently valid; and adding a flow in which (a) when a logical value of the conditional expression is false, processing of the obfuscation target program proceeds to a start of the loop, and (b) when the logical value of the conditional expression is true, the processing executes a set of executable statements equivalent to a set of executable statements which are ones from the first executable statement to a middle executable statement among a plurality of executable statements in the loop, and then the processing proceeds to an executable statement subsequent to the middle executable statement in the loop.

BRIEF DESCRIPTION OF THE DRAWINGS

Exemplary embodiments of the present invention will be described in detail based on the following figures, wherein.

DETAILED DESCRIPTION

Figure 1:
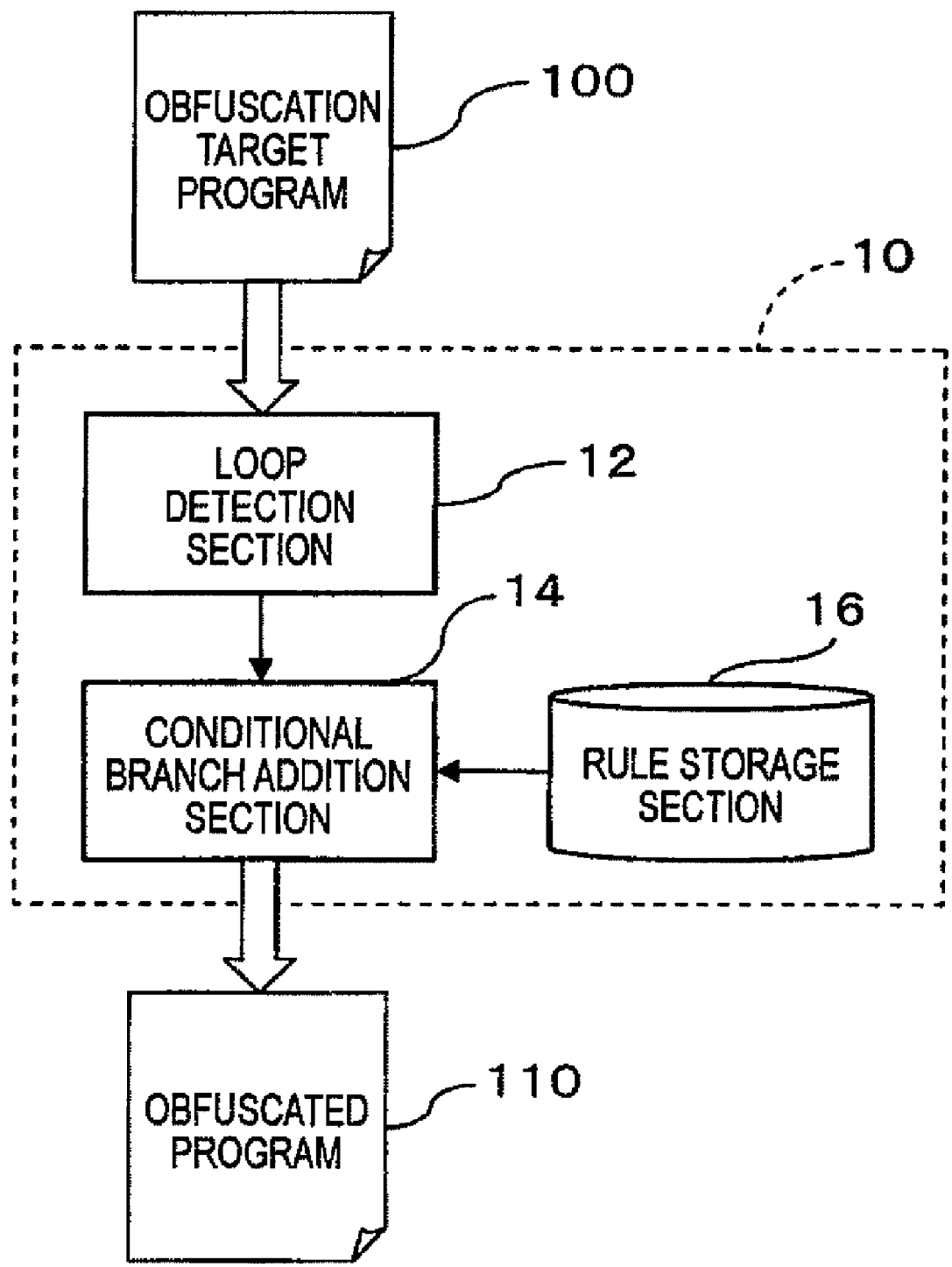
FIG. 1 is a diagram showing a schematic configuration of a program obfuscation apparatus according to an exemplary embodiment of the present invention.

In FIG. 1, there is shown a schematic configuration of a program obfuscation apparatus 10 according to an exemplary embodiment of the present invention. The program obfuscation apparatus 10 carries out an obfuscation process on an obfuscation target program 100 inputted thereto, thus generating and outputting an obfuscated program 110. The obfuscation target program 100 and the obfuscated program 110 are each provided as a binary program, for example.

The program obfuscation apparatus 10 includes: a loop detection section 12; a conditional branch addition section 14; and a rule storage section 16. The loop detection section 12 detects a loop structure from the obfuscation target program 100. The conditional branch addition section 14 adds, to the detected loop structure, a conditional branch for adding another entrance. The conditional branch to be added includes a conditional expression, an executable statement, etc. The rule storage section 16 retains rule information for generating a conditional expression and/or an executable statement, which constitute(s) the conditional branch to be added. The conditional branch addition section 14 makes reference to the rule information to add the conditional branch.

Figure 2:
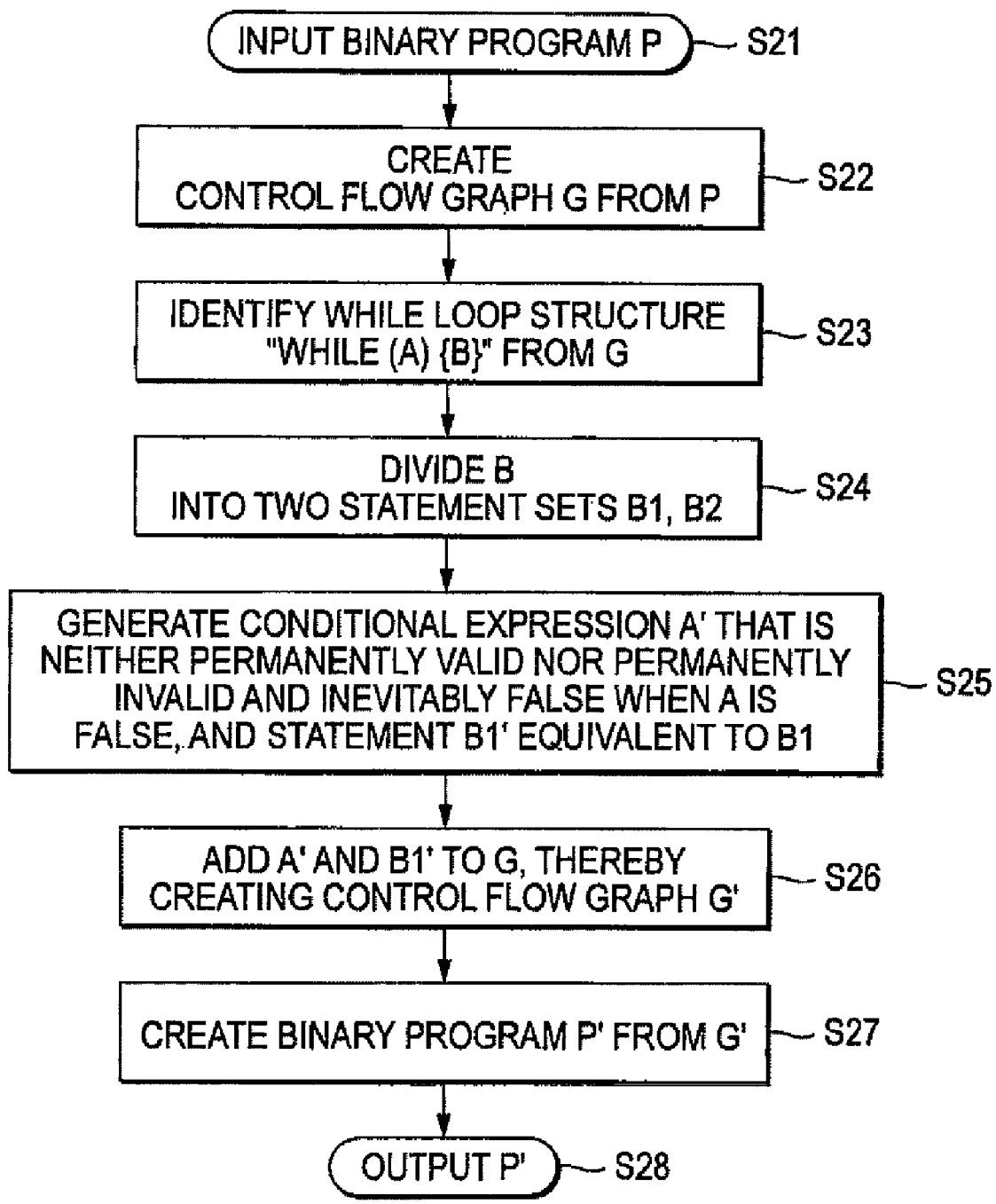
FIG. 2 is a flow chart showing an example of a process for obfuscating a while loop structure.

In FIG. 2, there is shown an example of an obfuscation process executed by the program obfuscation apparatus 10. This example is provided based on a case in which a conditional branch for obfuscation is added to a while loop structure included in the obfuscation target program 100.

Figure 3:
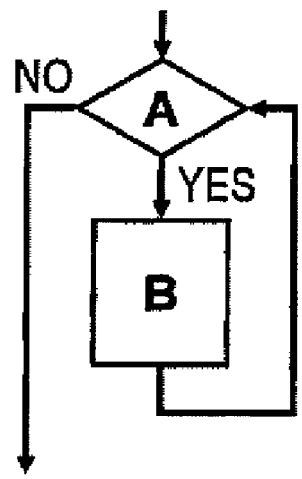
FIG. 3 is a diagram illustrating a control flow graph representing a while loop structure.

In this process, the apparatus 10 first receives, as an input, an obfuscation target binary program P (S21). Then, the loop detection section 12 creates a control flow graph G from this binary program P (S22). A process for generating a control flow graph from a binary program has been conventionally known, and such a conventional process maybe be used. Next, the loop detection section 12 optionally identifies a while loop structure from the control flow graph G (S23). In this example, a conditional expression for an entrance of the identified while loop structure will be denoted by "A", and a set of executable statements executed when the logical value of this conditional expression is true will be denoted by "B" (see FIG. 3). It should be noted that flow chart examples subsequent to FIG. 3, each arrow extending downward from a conditional expression block signifies a flow when the logical value of a conditional expression is true, while each arrow extending leftward from a conditional expression block signifies a flow when the logical value of a conditional expression is false.

Figure 4:
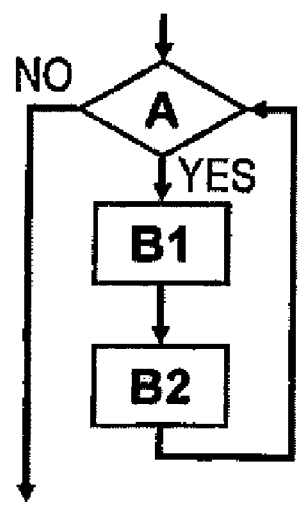
FIG. 4 is a diagram illustrating division of an executable statement set in a while loop structure.
Figure 5:
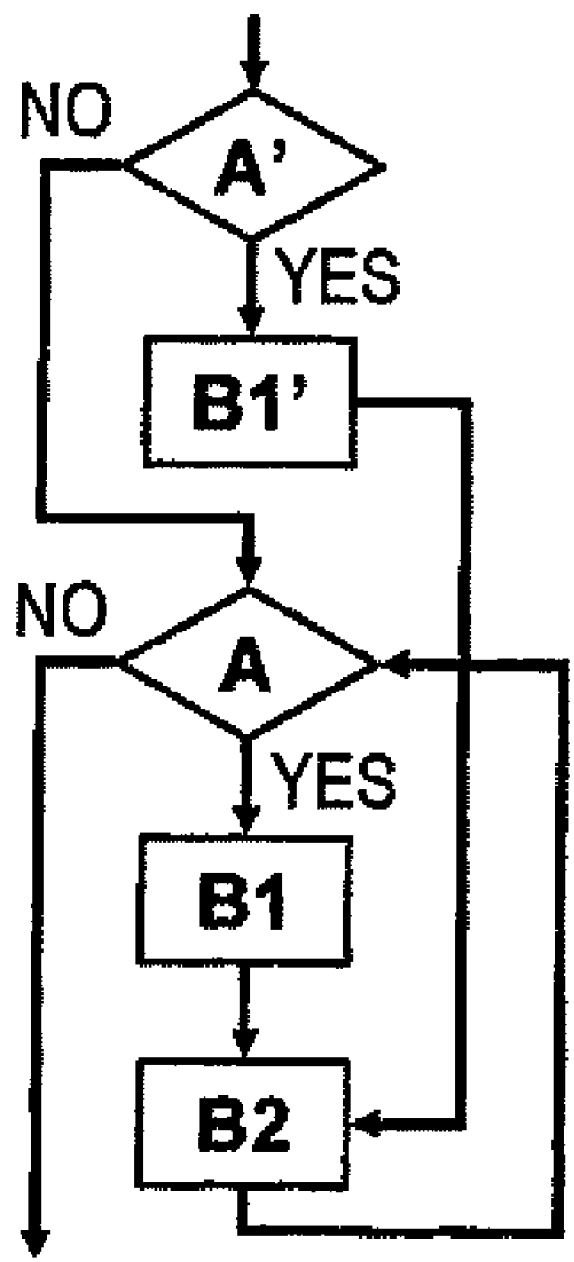
FIG. 5 is a diagram illustrating a control flow graph resulting from obfuscation of a while loop structure.

Subsequently, the conditional branch addition section 14 divides an executable statement set B into two sets B1 and B2 (see FIG. 4, (S24)). Each of the sets B1 and B2 includes one or more executable statements. Then, the conditional branch addition section 14 generates: a conditional expression A' that is neither permanently valid nor permanently invalid, and inevitably evaluated as being false when the logical value of a conditional expression A is false; and a statement set B1' equivalent to the statement set B1 (S25). Next, the conditional branch addition section 14 adds, to the control flow graph G, the statement set B1' and the conditional expression A' in accordance with the following procedures (i) and (ii), thereby creating a control flow graph G' (see FIG. 5, (S26)). Specifically, in the procedure (i), the executable statement set B1' is added to the control flow graph C, and there is further added an unconditional branch flow in which processing proceeds to the executable statement set B2 after the executable statement set B1' has been executed. In the procedure (ii), the conditional expression A' is added to the control flow graph G, and there is further added a conditional branch flow in which processing proceeds to the executable statement set B1' when the logical value of the conditional expression A' is true, but proceeds to the conditional expression A when the logical value of the conditional expression A' is false.

Subsequently, the conditional branch addition section 14 creates a binary program P' from the control flow graph G' (S27), and outputs the generated binary program P' (S28).

It should be noted that when a plurality of while loops exist in the control flow graph G, the steps of S23 to S26 are performed for each of the while loops.

Next, processing contents of the process procedure of FIG. 2 will be further described using a specific example. For example, the description will be made on the assumption that a while loop "while (a>0){b=a+1;c=2*b;a=a−1;}", for example, is included in the obfuscation target program P.

Figure 6:
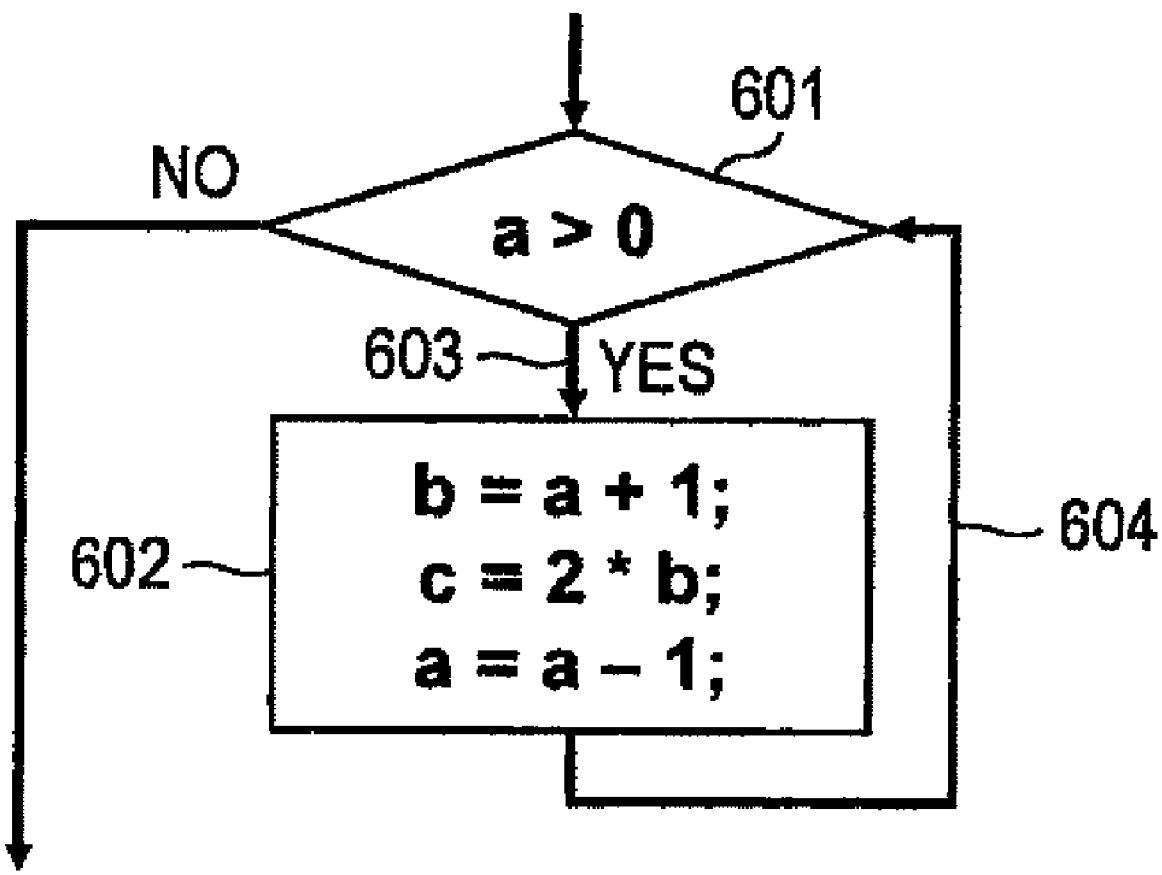
FIG. 6 is a diagram showing a specific example of a control flow graph representing a while loop structure.

In this case, a part of the control flow graph G, which represents this while loop, will be provided as shown in FIG. 6. This while loop includes: a flow 603 in which processing proceeds to an executable statement set 602 consisting of three executable statements {b=a+1;c=2*b;a=a−1;} when the logical value of a conditional expression 601 (a>0) is true; and a flow 604 in which the process returns to the conditional expression 601 after the executable statement set 602 has been executed. The description is made on the assumption that this loop structure is selected in Step S23, and the executable statement set B (602) is divided into two sets, i.e., B1={b=a+1;} and B2={c=2*b;a=a−1;}, in Step S24. How the executable statement set should be divided in Step S24 may be registered in advance as rule information in the rule storage section 16. As the rule information mentioned above, for example, a rule for determining the first single statement of the executable statement set B as the set B1, and determining a set of the remaining statements as the set B2 may be provided.

Next, the description is made on the assumption that in Step S25, the conditional branch addition section 14 creates, for example, a>10 as the conditional expression A', and creates b={a+a*(a−1)%2+1;} as the executable statement set B1' to be added (where % represents a remainder operator). The conditional expression A' created in this example satisfies the following condition shown in Step S25: "the conditional expression A' is neither permanently valid nor permanently invalid, and inevitably evaluated as being false when the logical value of the conditional expression A is false". The conditional expression A', which satisfies such a condition, may be automatically generated based on the rule information registered in the rule storage section 16. For example, when the original conditional expression A is an inequality, conceivable rules include a rule for replacing the smaller-side value ("0" in the example of FIG. 6) of this inequality with a greater value (e.g., "10"), or a rule for replacing, in a reverse manner, the greater-side value ("a" in the example of FIG. 6) with a smaller value (e.g., "a−10"). Furthermore, as another rule, a rule for adding a term by which an arithmetic result becomes 0 (e.g., "a*(a−1)%2") to the left side or right side of the conditional expression A may also be conceivable. According to this rule, the original conditional expression A and the conditional expression A' to be added become equivalent to each other. The conditional expression A' equivalent to the original conditional expression A as mentioned above also satisfies the following condition: "the conditional expression A' is neither permanently valid nor permanently invalid, and inevitably evaluated as being false when the logical value of the conditional expression A is false". It should be noted that the conditional expression A' to be added may be identical to the original conditional expression A; however, to realize obfuscation, an expression different from the original conditional expression may be used as illustrated above. Further, also as for the statement set B1' created in this example, the value resulting from a*(a−1)%2 becomes 0 even if the variable a is any value, and therefore, the statement set B1' is equivalent to the statement set B1. As a rule for generating an executable statement equivalent to a certain executable statement, a rule for generating a formula different in expression but arithmetically equivalent is conceivably used. The statement set B1' to be added to the control flow graph G may be identical to the original statement set B1; however, to increase obfuscation, an expression different from the original expression may be used.

Figure 7:
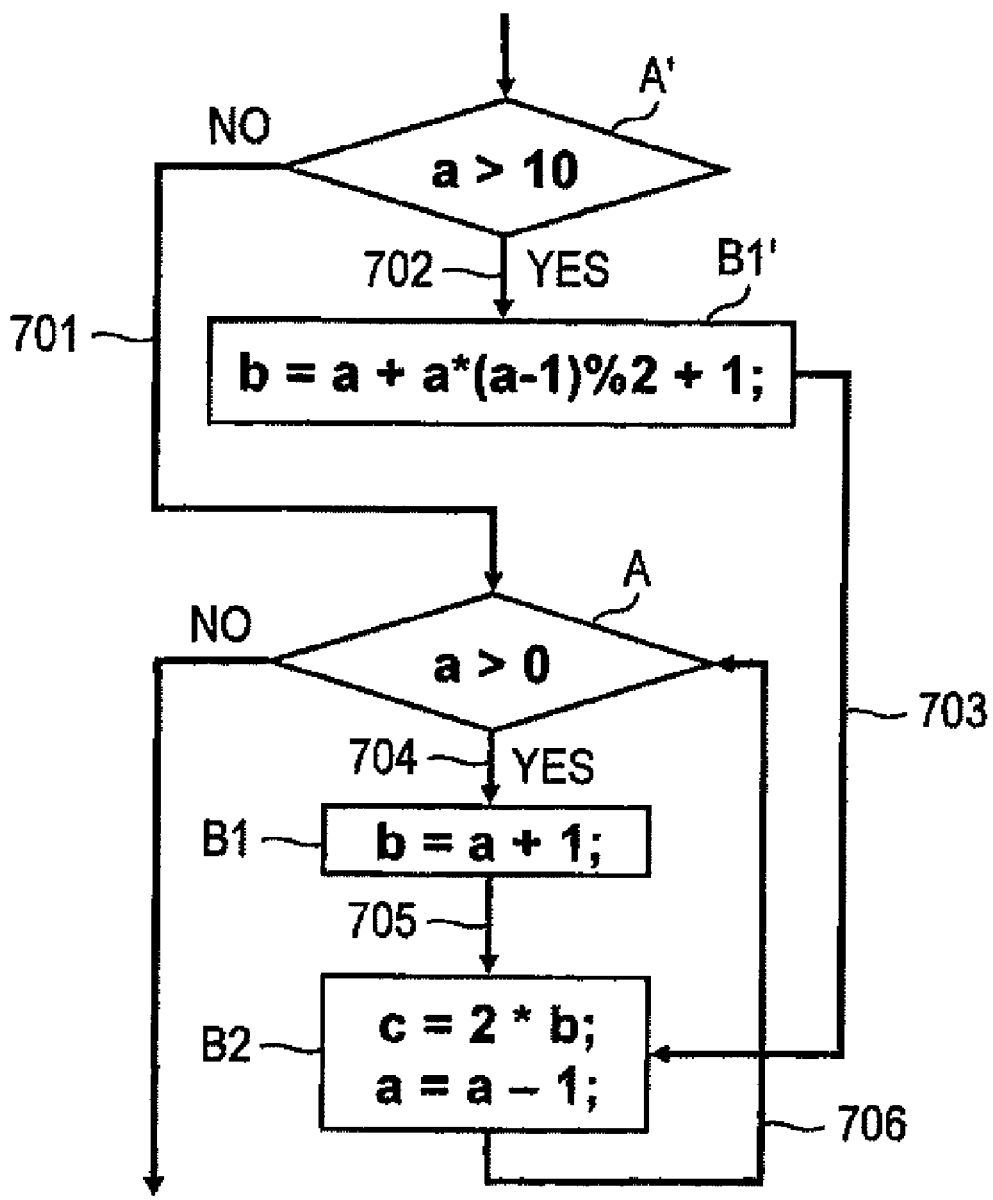
FIG. 7 is a diagram showing an example of an obfuscation result of the while loop structure of FIG. 6.

Furthermore, as illustrated in FIG. 7, the conditional branch addition section 14 adds the conditional expression A' and the executable statement set B1' to the while loop of FIG. 6. Moreover, there are further added: a flow 701 in which processing proceeds to the conditional expression A when the evaluation result for the conditional expression A' is false; a flow 702 in which processing proceeds to the executable statement set B1' when the evaluation result for the conditional expression A' is true; and a flow 703 in which processing proceeds to the executable statement set B2 (more specifically, the first statement "c=2*b;" in this set) after the executable statement set B1' has been executed. It should be noted that, in the flow graph of FIG. 7, the loop structure consisting of the flows 704, 705 and 706 is equivalent to the loop structure consisting of the flows 603 and 604 shown in FIG. 6.

In the control flow graph G' resulting from the obfuscation shown in FIG. 7, there exist two entrances, i.e., the flows 701 and 703, for the loop structure (704 to 706) equivalent to the loop structure consisting of the flows 603 and 604. Further, since the conditional expression A' is neither permanently valid nor permanently invalid, either of the flows 701 and 703 can be followed depending on the value of the variable a. Furthermore, in this obfuscation process, no new statement is added to the loop structure consisting of the flows 603 and 604 present in the original control flow graph G.

The operation of the program portion having the structure shown in FIG. 6 is equivalent to that of the program portion having the obfuscated structure shown in FIG. 7. More specifically, first, assuming that the value of the variable a is 10 or less immediately before the execution of the program portion of FIG. 7, the condition determination for a>10 is false in this case, and the control proceeds to the conditional expression A by following the flow 701. The subsequent control is evidently similar to that of FIG. 6. On the other hand, assuming that the value of the variable a is greater than 10 immediately before the execution of the program portion, the condition determination for a>10 is true in this case, and the control proceeds to the executable statement set B1' (i.e., "b=a+a*(a−1)%2+1;") by following the flow 702. Thereafter, the control proceeds to the executable statement set B2 (i.e., "c=2*b; a=a−1;") in the loop, and returns to the conditional expression A after the executable statement set B2 has been executed. In this case, since the executable statement sets 81 ("b×a+1;") and B1' ("b=a+a*(a−1)%2+1;") are equivalent to each other, the arithmetic result obtained when the executable statement set B2 is executed after the executable statement set B1 has been executed, and the arithmetic result obtained when the executable statement set B2 is executed after the executable statement set B1' has been executed are equivalent to each other. Then, since processing proceeds to the conditional expression A after the executable statement set B2 has been executed, the loop becomes similar to that of FIG. 6. As described above, the process illustrated in FIG. 2 modifies the program so as to allow the loop structure to have a plurality of entrances without changing the original program operation.

Figure 8:
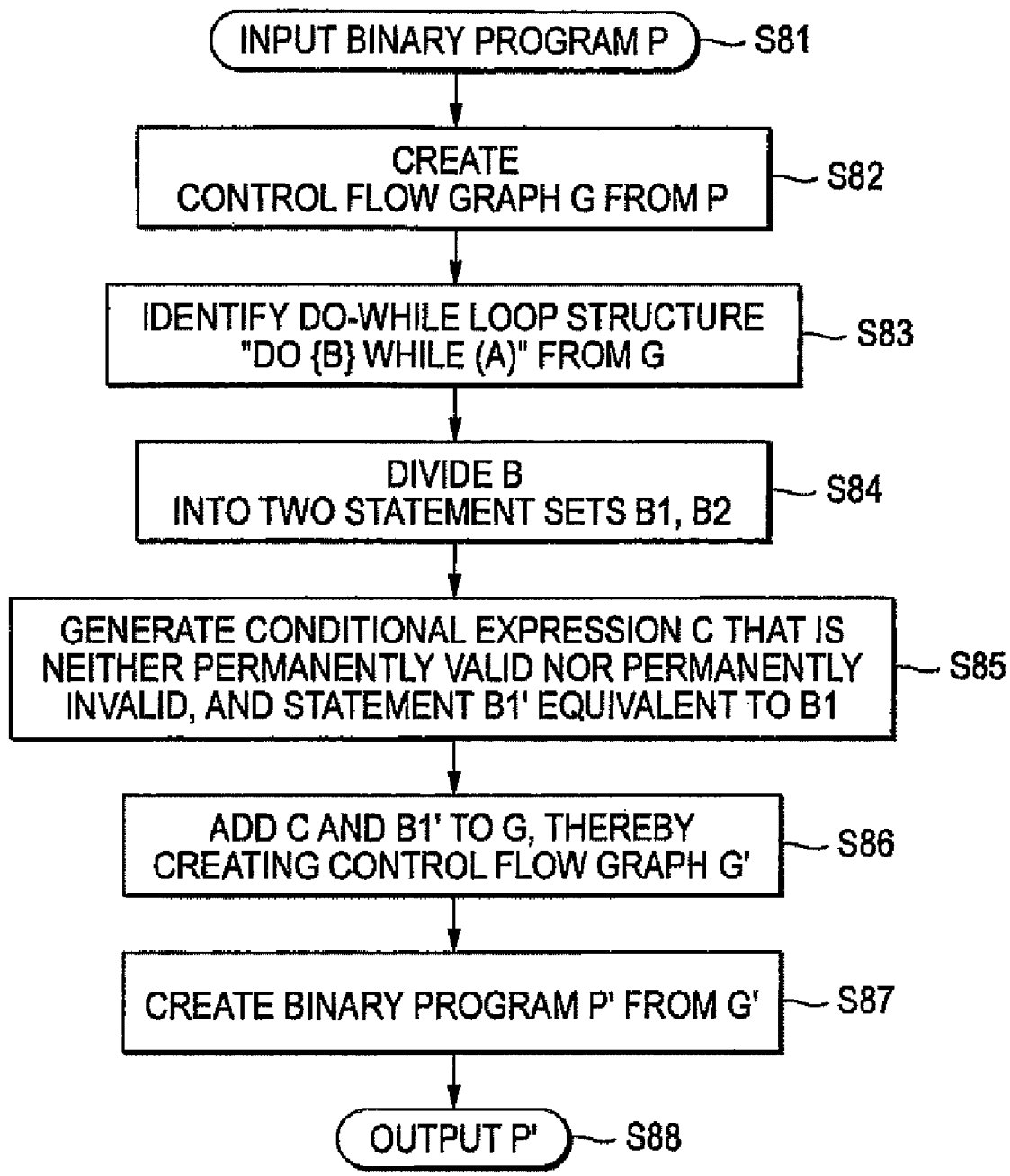
FIG. 8 is a flow chart showing an example of a process for obfuscating a do-while loop structure.

The example of the process for obfuscating the while loop structure in the original program has been described thus far. Hereinafter, an example of a process for obfuscating a do-while loop structure will be described. Referring to FIG. 8, an example of procedure of this process will be described.

Figure 9:
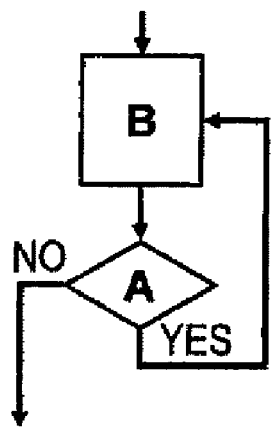
FIG. 9 is a diagram illustrating a control flow graph representing a do-while loop structure.
Figure 10:
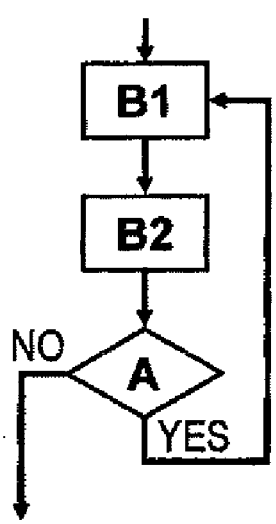
FIG. 10 is a diagram illustrating division of an executable statement set in a do-while loop structure.

In this process, the apparatus 10 first receives, as an input, an obfuscation target binary program P (S81). Then, the loop detection section 12 creates a control flow graph G from this binary program P (S82). Next, the loop detection section 12 optionally identifies a do-while loop structure from the control flow graph G (S83). In this example, an executable statement set in the identified do-while loop structure will be denoted by "B", and a conditional expression for an exit of the identified do-while loop structure will be denoted by "A" (see FIG. 9). Subsequently, the conditional branch addition section 14 divides an executable statement set B into two sets B1 and B2 (see FIG. 10, (S84)).

Figure 11:
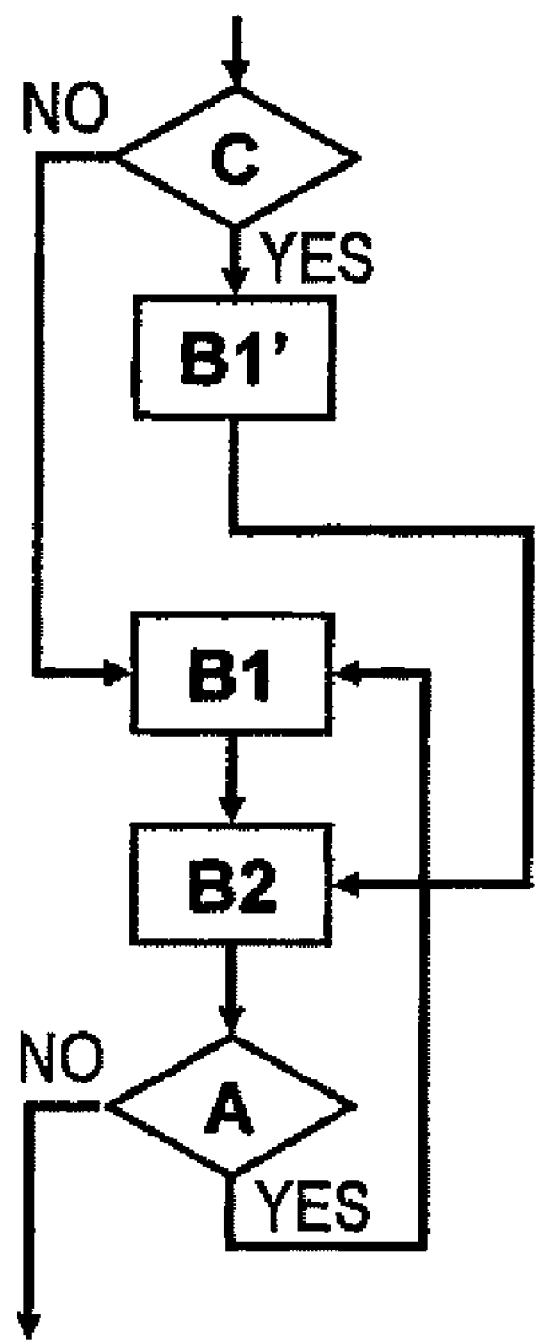
FIG. 11 is a diagram illustrating a control flow graph resulting from obfuscation of a do-while loop structure.

Then, the conditional branch addition section 14 generates: a conditional expression C that is neither permanently valid nor permanently invalid; and a statement set B1' equivalent to the statement set B1 (S85). Next, the conditional branch addition section 14 adds, to the control flow graph G, the statement set B1' and the conditional expression C in accordance with the following procedures (i) and (ii), thereby creating a control flow graph G' (see FIG. 11, (S86)). Specifically, in the procedure (i), the executable statement set B1' is added to the control flow graph G, and there is further added an unconditional branch flow in which processing proceeds to the executable statement set B2 after the executable statement set B1' has been executed. In the procedure (ii), the conditional expression C is added to the control flow graph G, and there is further added a conditional branch flow in which processing proceeds to the executable statement set B1' when the logical value of the conditional expression C is true, but proceeds to the executable statement set B1 when the logical value of the conditional expression C is false. Subsequently, the conditional branch addition section 14 creates a binary program P' from the control flow graph C' (S87), and outputs the generated binary program P' (S88).

It should be noted that when a plurality of do-while loops exist in the control flow graph G, the steps of S83 to S86 are performed for each of the do-while loops.

Figure 12:
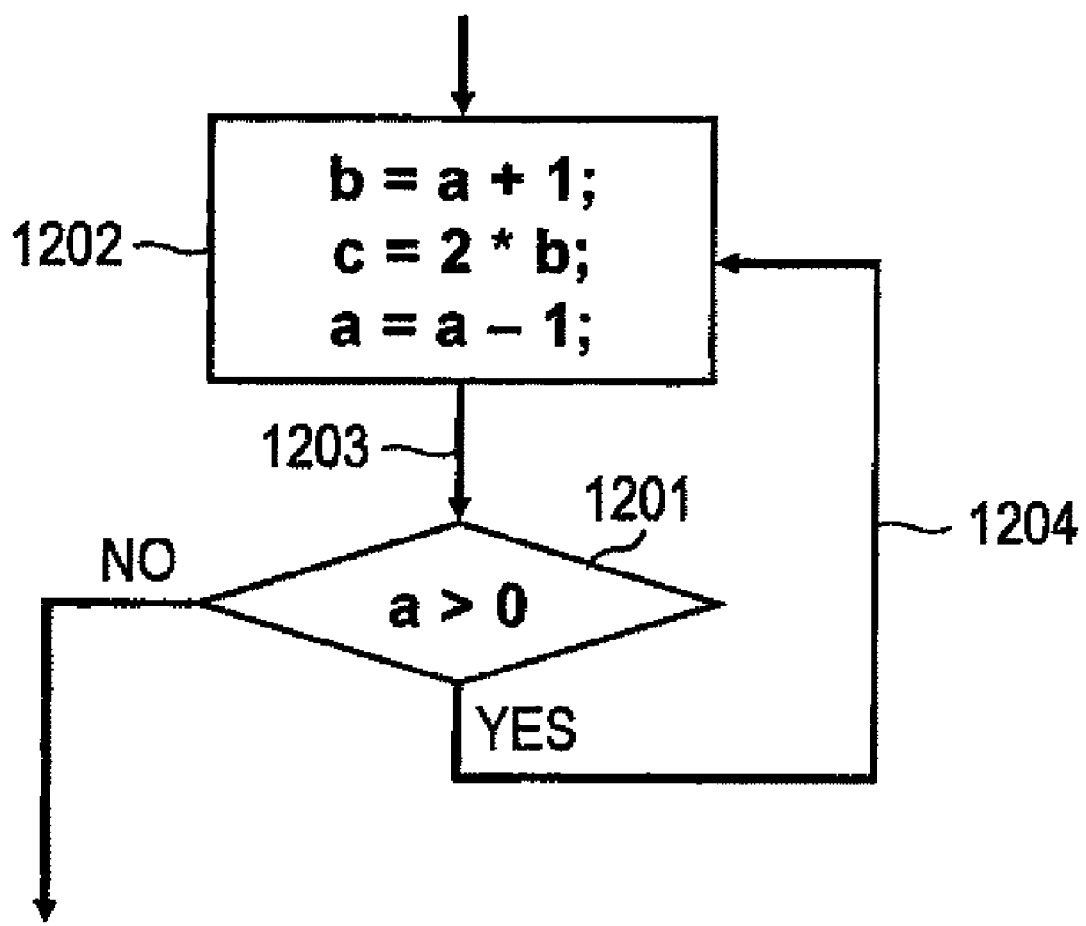
FIG. 12 is a diagram showing a specific example of a control flow graph representing a do-while loop structure.

Next, processing contents of the process procedure of FIG. 8 will be further described using a specific example. For example, the description will be made on the assumption that a do-while loop "do{b=a+1;c=2*b;a=a−1;} while (a>0)", for example, is included in the obfuscation target program P. In this case, a part of the control flow graph G, which represents this do-while loop, will be provided as shown in FIG. 12. Hereinafter, the flow of the process for converting such a loop into a loop shown in FIG. 13 will be described.

In this case, this do-while loop includes: a flow 1203 in which processing proceeds to a conditional expression 1201 (a>0) after an executable statement set 1202 consisting of three executable statements {b=a+1;c=2*b;a=a−1;} has been executed; and a flow 1204 in which processing proceeds to the executable statement set 1202 when the conditional expression 1201 is true. The description is made on the assumption that this loop structure is selected in Step S83, and the executable statement set B (1202) is divided into two sets, i.e., B1={b=a+1;} and B2={c=2*b;a=a−1;}, in Step S84. How the executable statement set should be divided in Step S84 may be registered in advance as rule information in the rule storage section 16.

Next, the description is made on the assumption that in Step S85, the conditional branch addition section 14 creates, for example, "b>c" as the conditional expression C, and creates b={a+a*(a−1)%2+1;} as the executable statement set B1' to be added. The conditional expression C created in this example satisfies the following condition: "the conditional expression C is neither permanently valid nor permanently invalid". The conditional expression C, which satisfies such a condition, may be automatically generated based on the rule information registered in the rule storage section 16. For example, conceivable rules include a rule for generating, as the conditional expression C, an inequality having, on its left side and right side, two variables included in the obfuscation target program. When a plurality of do-while loops are included in the obfuscation target program, the conditional expressions C to be added may be identical to each other for all the do-while loops; however, to increase obfuscation, a different formula may be used as the conditional expression C for each loop. The statement set B1' created in this example is similar to that added in the example of FIG. 7, and therefore, the description thereof will be omitted.

Figure 13:
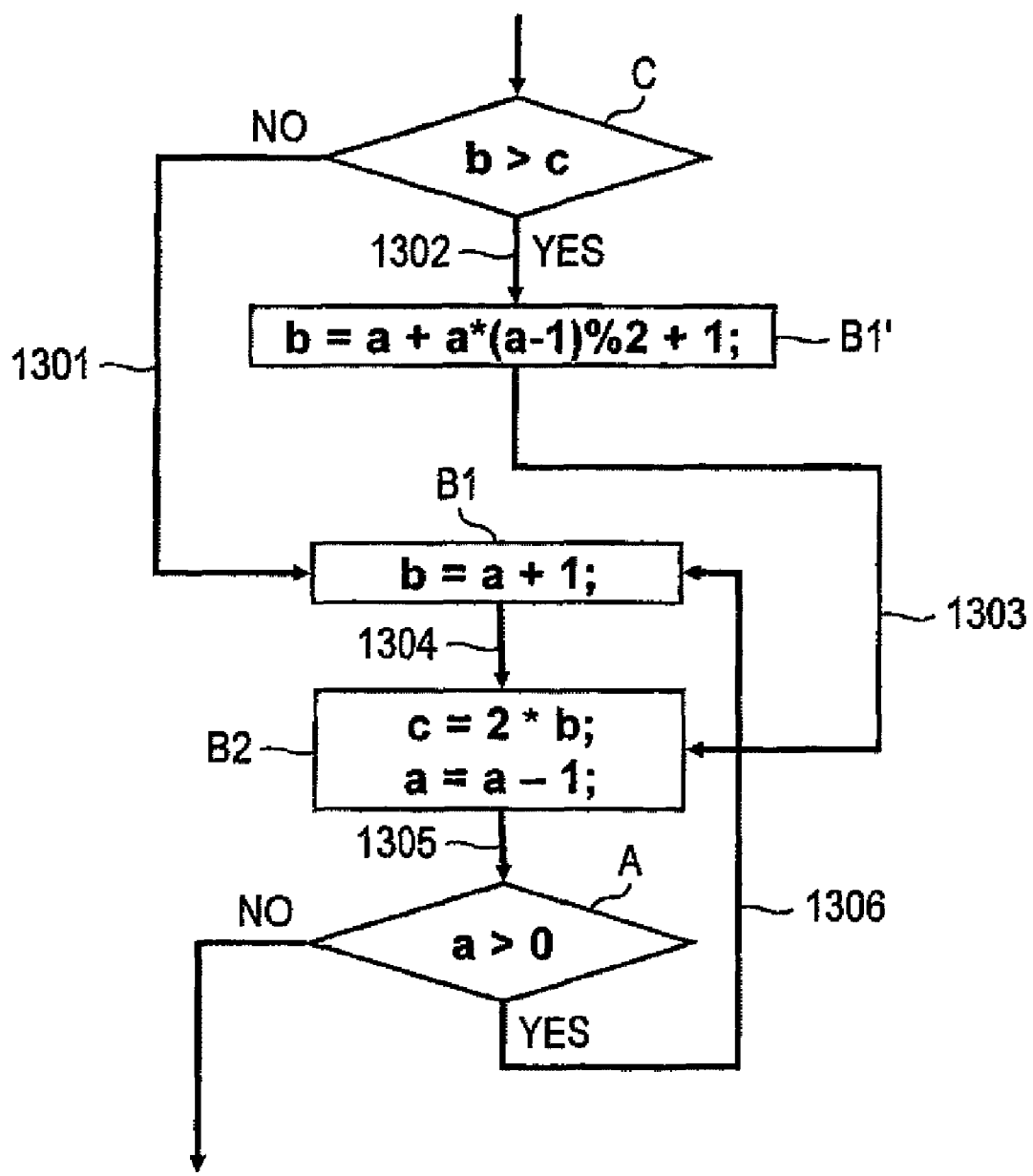
FIG. 13 is a diagram showing an example of an obfuscation result of the do-while loop structure of FIG. 12.

Furthermore, as illustrated in FIG. 13, the conditional branch addition section 14 adds the conditional expression C and the executable statement set B1' to the do-while loop of FIG. 12. Moreover, there are further added: a flow 1301 in which processing proceeds to the conditional expression B1 when the evaluation result for the conditional expression C is false; a flow 1302 in which processing proceeds to the executable statement set B1' when the evaluation result for the conditional expression C is true; and a flow 1303 in which processing proceeds to the executable statement set B2 (more specifically, the first statement "c=2*b;" in this set) after the executable statement set B1' has been executed. It should be noted that, in the flow graph of FIG. 13, the loop structure consisting of the flows 1304, 1305 and 1306 is equivalent to the loop structure consisting of the flows 1203 and 1204 shown in FIG. 12.

In the control flow graph C' resulting from the obfuscation shown in FIG. 13, there exist two entrances, i.e., the flows 1301 and 1303, for the loop structure (1304 to 1306) equivalent to the loop structure consisting of the flows 1203 and 1204. Further, since the conditional expression C is neither permanently valid nor permanently invalid, either of the flows 1301 and 1303 can be followed depending on the values of the variables in the formula. Furthermore, no new statement is added to the loop structure consisting of the flows 1203 and 1204 present in the original control flow graph G.

The operation of the program portion having the structure shown in FIG. 12 is equivalent to that of the program portion having the obfuscated structure shown in FIG. 13. More specifically, first, assuming that the variable b is equal to or less than the variable c immediately before the execution of the program portion shown in FIG. 13, the control proceeds to the executable statement set B by following the flow 1301 in this case. The subsequent control is evidently similar to that of FIG. 12. On the other hand, assuming that the variable c is less than the variable b immediately before the execution of the program portion, the control proceeds to the executable statement set B1' (i.e., "b=a+a*(a−1)%2+1;") by following the flow 1302. Thereafter, the control proceeds to the executable statement set B2 (i.e., "c=2*b;a=a−1;") in the loop, and returns to the conditional expression A after the executable statement set B2 has been executed. In this case, since the executable statement sets B1 and B1' are equivalent to each other, the arithmetic result obtained when the executable statement set B2 is executed after the executable statement set B1 has been executed, and the arithmetic result obtained when the executable statement set B2 is executed after the executable statement set B1' has been executed are equivalent to each other. Then, since processing proceeds to the conditional expression A after the executable statement set B2 has been executed, the loop becomes similar to that of FIG. 12. As described above, the process illustrated in FIG. 8 modifies the program so as to allow the do-while loop structure to have a plurality of entrances without changing the original program operation.

Hereinafter, an example of a process for obfuscating a do-while loop structure to a degree higher than that of the process illustrated in FIG. 8 will be described with reference to FIGS. 14 to 19.

In this process, the apparatus 10 first receives, as an input, an obfuscation target binary program P (S141). Then, the loop detection section 12 creates a control flow graph G from this binary program P (S142). Next, the loop detection section 12 optionally identifies a do-while loop structure from the control flow graph G (S143). In this example, an executable statement set in the identified do-while loop structure will be denoted by "B", a conditional expression for an exit of the identified do-while loop structure will be denoted by "A", and the description will be made on the assumption that an executable statement set D is executed when a conditional expression A is false (see FIG. 15). Subsequently, the conditional branch addition section 14 divides an executable statement set B into two sets B1 and B2 (see FIG. 16, (S144)).

Then, the conditional branch addition section 14 generates: a conditional expression C that is neither permanently valid nor permanently invalid; a conditional expression C' equivalent to the conditional expression C; and a statement set B1' equivalent to the executable statement set B1 (S145). Furthermore, in Step S145, the conditional branch addition section 14 further generates: executable statements M1 and M2 for reversibly converting a variable that is not used in the obfuscation target do-while loop structure; and executable statements R1 and R2 representing reverse conversion of these executable statements M1 and M2. In other words, the executable statements M1 and M2 are executable statements representing reversible variable conversion (i.e., which allows the variable to return to one identical to the original variable by reverse conversion). The variable converted by the executable statement M1 is returned to the value identical to the original variable by executing the corresponding executable statement R1. The executable statements M2 and R2 also have the similar relationship.

Figure 17:
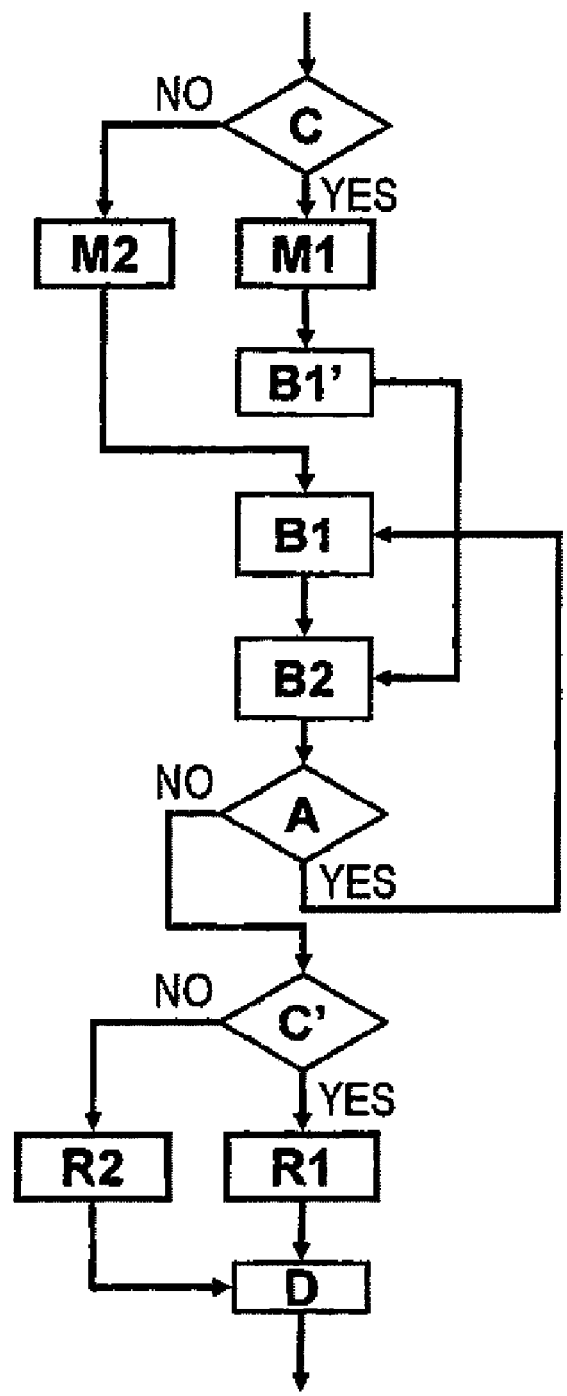
FIG. 17 is a diagram illustrating a control flow graph resulting from obfuscation of a do-while loop structure.

Next, the conditional branch addition section 14 adds, to the control flow graph G, the statement B1', the statements M1 and M2, the conditional expressions C and C', and the statements R1 and R2 in accordance with the following procedures (i) to (viii), thereby creating a control flow graph i' (see FIG. 17, (S146)) Specifically, first, in the procedure (i), the executable statement set B1' is added to the control flow graph G, and there is further added an unconditional branch flow in which processing proceeds to the executable statement set B2 after the executable statement set B1' has been executed. Furthermore, in the procedure (ii), the executable statement M1 is added, and there is added an unconditional branch flow in which processing proceeds to the executable statement set B1' after the executable statement M1 has been executed. In the procedure (iii), the executable statement M2 is added, and there is added an unconditional branch flow in which processing proceeds to the executable statement set B1 after the executable statement M2 has been executed. In the procedure (iv), the conditional expression C is added, and there is further added a conditional branch flow in which processing proceeds to the executable statement M1 when the logical value of the conditional expression C is true, but proceeds to the executable statement M2 when the logical value of the conditional expression C is false. In the procedure (v), a flow in which processing proceeds to an executable statement set D when the logical value of the conditional expression A is false is deleted. In the procedure (vi), a conditional expression C' is added, and there is further added a flow in which processing proceeds to the conditional expression C' when the logical value of the conditional expression A is false. In the procedure (vii), the executable statement R1 is added, and there are further added: a flow in which processing proceeds to the executable statement R1 when the logical value of the conditional expression C' is true; and an unconditional branch flow in which processing proceeds to the executable statement set D after the executable statement R1 has been executed. And in the procedure (viii), the executable statement R2 is added, and there are further added: a flow in which processing proceeds to the executable statement R2 when the logical value of the conditional expression C' is false; and a flow in which processing unconditionally proceeds to the executable statement set D after the executable statement R2 has been executed.

Subsequently, from the control flow graph G' generated as described above, the conditional branch addition section 14 creates a binary program P' (S147), and outputs the generated binary program P' (S148).

It should be noted that when a plurality of do-while loops exist in the control flow graph G, the steps of S143 to S146 are performed for each of the do-while loops.

Figure 14:
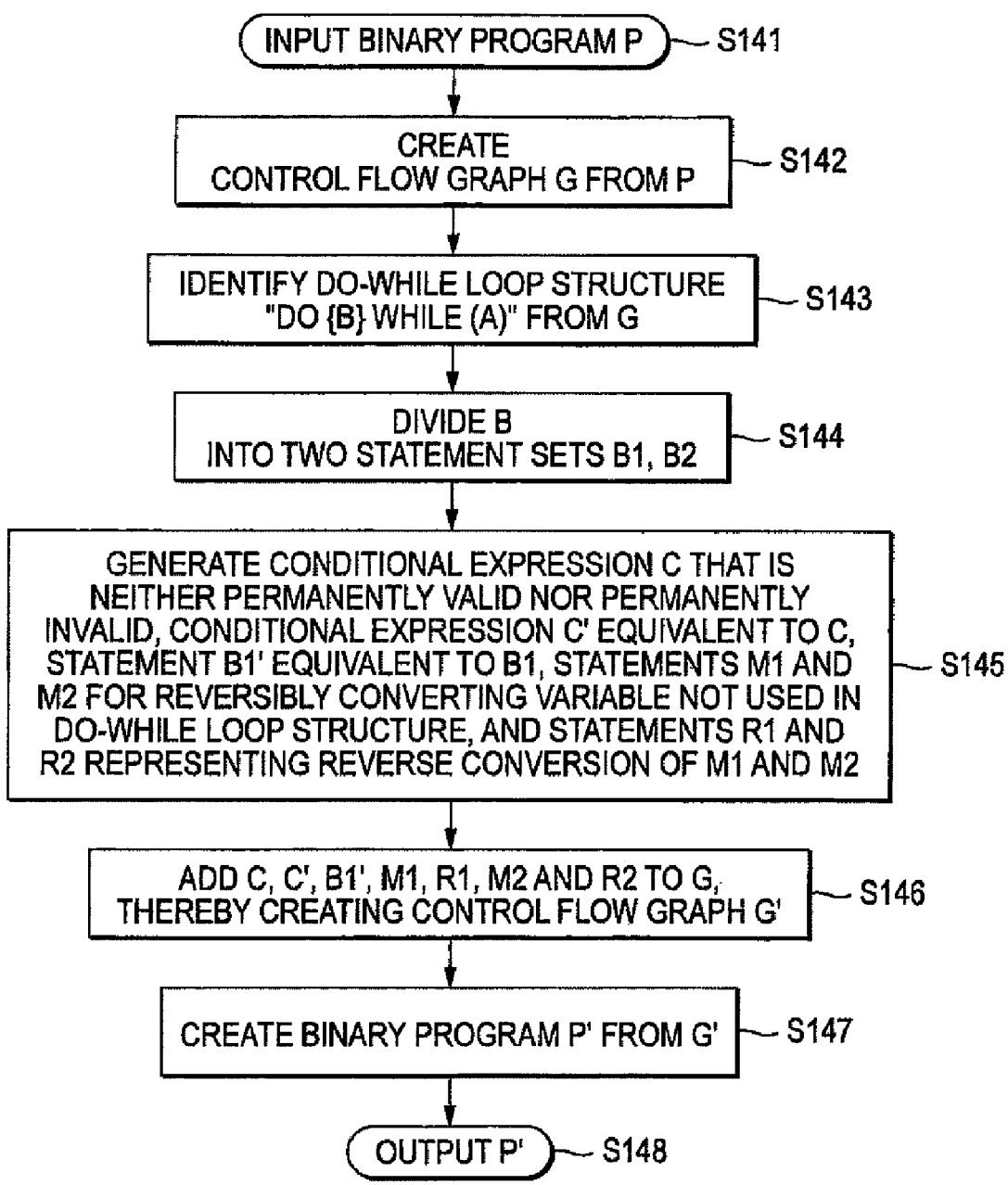
FIG. 14 is a flow chart showing another example of a process for obfuscating a do-while loop structure.
Figure 15:
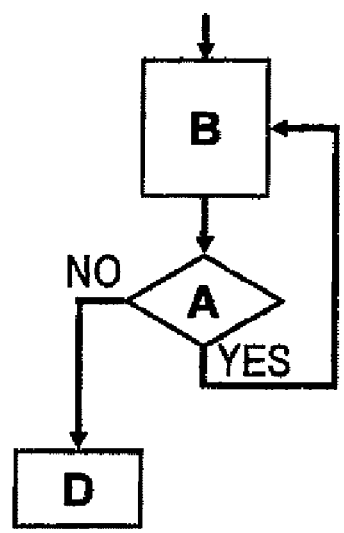
FIG. 15 is a diagram illustrating a control flow graph representing a do-while loop structure.
Figure 16:
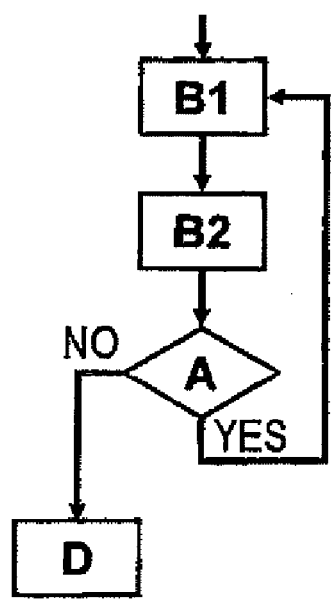
FIG. 16 is a diagram illustrating division of an executable statement set in a do-while loop structure.

Next, processing contents of the process procedure of FIG. 14 will be further described using a specific example. For example, the description will be made on the assumption that a program portion "do{b=a+1;c=2*b;a=a−1;} while (a>0); d=b+c+e;" including a do-while loop, for example, is included in the obfuscation target program P.

Figure 18:
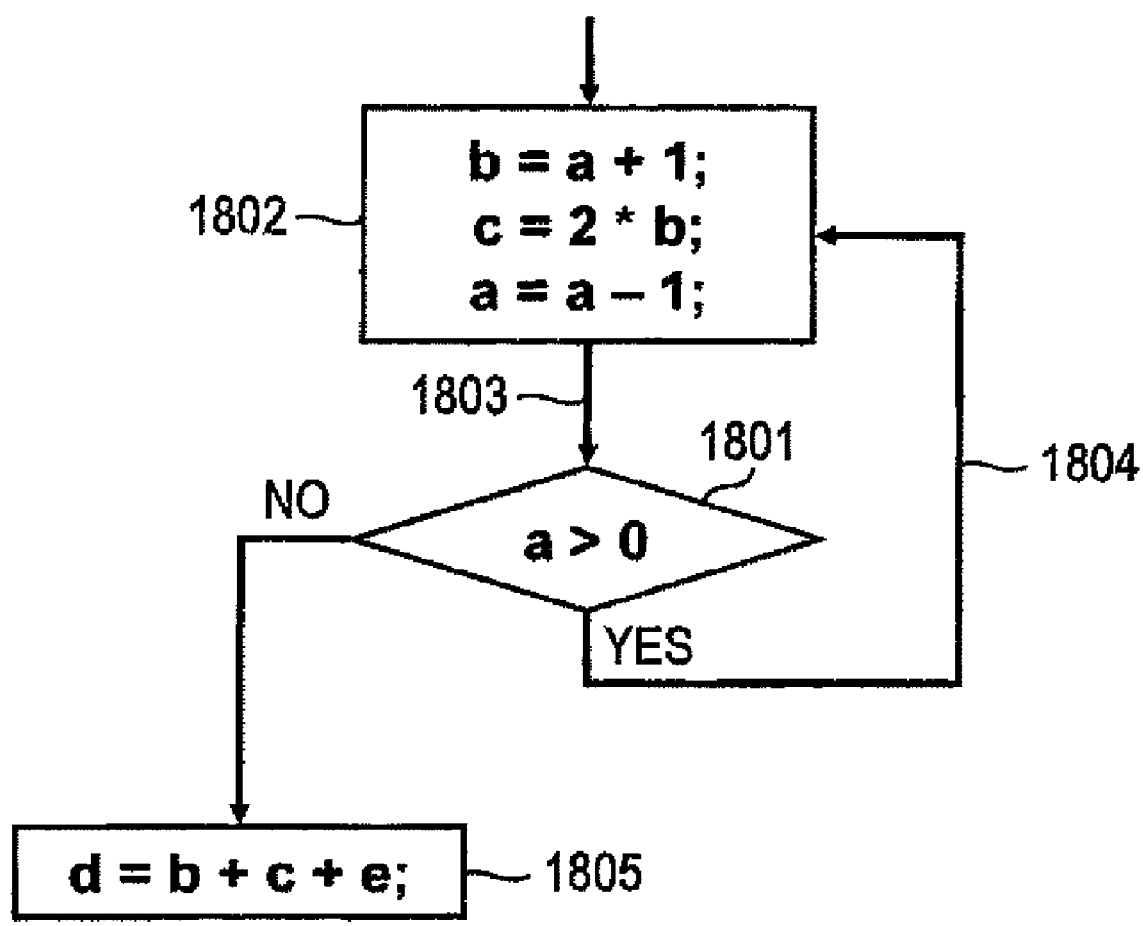
FIG. 18 is a diagram showing a specific example of a control flow graph representing a do-while loop structure.

In this case, a part of the control flow graph G, which represents this program portion, will be provided as shown in FIG. 18. Hereinafter, the flow of the process for converting such a program portion into a program portion shown in FIG. 19 will be described.

The do-while loop in this program portion includes: a flow 1803 in which processing proceeds to a conditional expression 1801 (a>0) after an executable statement set 1802 consisting of three executable statements {b=a+1;c=2*b;a=a-1;} has been executed; and a flow 1804 in which processing proceeds to the executable statement set 1802 when the conditional expression 1801 is true. In addition, in this program portion, a flow in which processing proceeds to the executable statement D (1805) when the conditional expression 1801 is false is further included. The description is made on the assumption that this loop structure is selected in Step S143, and the executable statement set B (1802) is divided into two sets, i.e., B1={b=a+1;} and B2={c=2*b;a=a-1;}, in Step S144. How the executable statement set should be divided in Step S144 may be registered in advance as rule information in the rule storage section 16.

Next, in Step S145, the conditional branch addition section 14 creates, for example, "e>10" as the conditional expression C, creates "e>0&&e*e>100" as the conditional expression C' equivalent to this conditional expression C, and creates "b={a+a*(a-1)%2+1;}" as the executable statement set B1' to be added. The conditional expression C created in this example satisfies the following condition: "the conditional expression C is neither permanently valid nor permanently invalid". The conditional expression C, which satisfies such a condition, may be automatically generated based on the rule information registered in the rule storage section 16. For example, conceivable rules include a rule for generating, as the conditional expression C, an inequality in which a variable that is not used in the obfuscation target program is introduced, and this variable is greater than a predetermined constant. Furthermore, the rule for generating the conditional expression C' can be determined so as to correspond to the rule for generating the conditional expression C. For example, when the above-mentioned inequality is determined as the conditional expression C, conceivable rules include a rule for generating the conditional expression C' in which the square of the variable appearing in this inequality is greater than the square of the constant thereof, and this variable is positive. Thus, as a rule for generating a conditional expression equivalent to a certain conditional expression, a rule for generating a formula different in expression but arithmetically equivalent is conceivably used. The statement set B1' created in this example is similar to that added in the example of FIG. 7, and therefore, the description thereof will be omitted.

Figure 19:
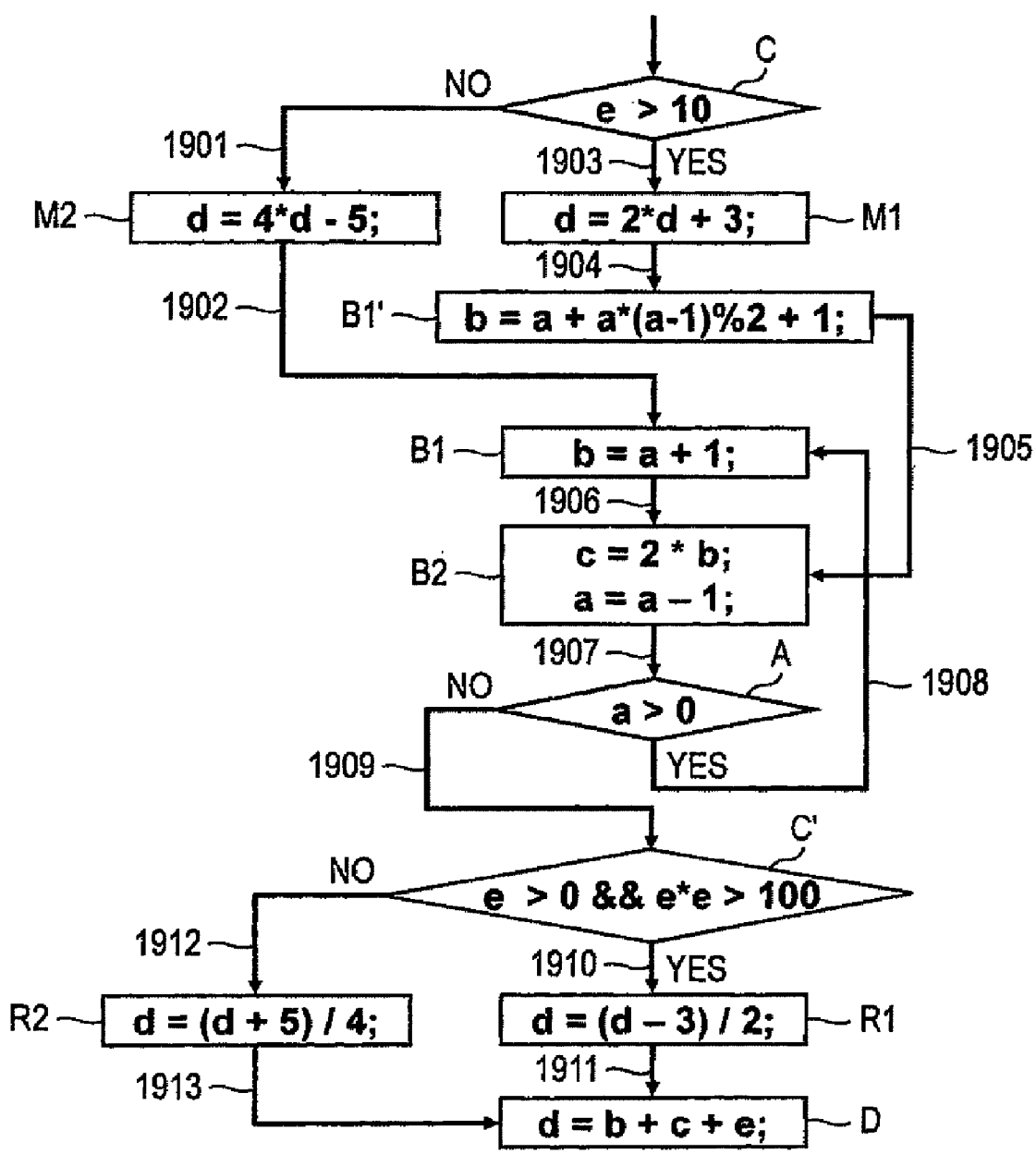
FIG. 19 is a diagram showing an example of an obfuscation result of the do-while loop structure of FIG. 18.

Moreover, in Step S145, the conditional branch addition section 14 makes reference to the rule storage section 16 to create d=2*d+3 and d=4*d−5 as the statements M1 and M2 for reversible variable change, respectively, and create d=(d−3)/2 and d=(d+5)/4 as the statements R1 and R2 for reveres conversion of the statements M1 and M2, respectively. For example, a set of reversible conversion x=2*x+3 and the reverse conversion thereof x=(x−3)/2 may be registered as rule information in the rule storage section 16, and the conditional branch addition section 14 may determine a variable, which is not included in the obfuscation target loop structure, to substitute this variable for the variable x of this rule information, thereby generating the specific conversions M1 and R1. Further, a plurality of sets of such conversions and reverse conversions may be registered in the rule storage section 16, and from among the plurality of sets, the sets used for the statements M1 and M2 may be selected individually. Furthermore, when a plurality of do-while loops exist in the obfuscation target program, a combination of the statements M1 and M2 to be used may be changed for each of these do-while loops to increase obfuscation. In the example of FIG. 19, as a variable used in a reversible conversion statement to be added, the variable d used in the executable statement D immediately after the exit from the do-while loop is used (this variable d is not used in the do-while loop), but the present invention is not limited to this example. For example, a statement, in which a variable that is not included in the obfuscation target program is introduced and this variable is reversibly converted, may be generated. It is to be noted that in order to increase obfuscation, the variable included in the executable statement D immediately after the exit from the do-while loop is conceivably used.

Furthermore, as illustrated in FIG. 19, the conditional branch addition section 14 adds, to the do-while loop of FIG. 18, the executable statement set B1', the conditional expressions C and C', the statements M1 and M2 for reversible variable conversion, and the statements R1 and R2 for reverse conversion thereof. Moreover, there are further added: a flow 1901 in which processing proceeds to the statement M2 when the evaluation result for the conditional expression C is false; a flow 1902 in which processing proceeds to the statement set B1 after the statement M2 has been executed; a flow 1903 in which processing proceeds to the statement M1 when the evaluation result for the conditional expression C is true; a flow 1904 in which processing proceeds to the executable statement set B1' after the statement M1 has been executed; and a flow 1905 in which processing proceeds to the executable statement set B2 (more specifically, the first statement "c=2*b;" in this set) after the executable statement set B1' has been executed.

In the flow graph of FIG. 19, the loop structure consisting of the flows 1906, 1907 and 1908 is equivalent to the loop structure consisting of the flows 1803 and 1804 shown in FIG. 18.

Further, the conditional branch addition section 14 deletes the flow in which processing proceeds to the statement D when the conditional expression A is false, and adds a flow 1909 in which processing proceeds to the conditional expression C' when the conditional expression A is false. Moreover, there are further added: a flow 1910 in which processing proceeds to the reverse conversion R1 of the statement M1 when the conditional expression C' is true; and a flow 1911 in which processing proceeds to the statement D after the reverse conversion R1 has been executed. Besides, there are further added: a flow 1912 in which processing proceeds to the reverse conversion R2 of the statement M2 when the conditional expression C' is false; and a flow 1913 in which processing proceeds to the statement D after the reverse conversion R2 has been executed.

The variables, converted by the variable conversion statements M1 and M2 added in the above-described process, are returned to the original values by the corresponding reverse conversion statements R1 and R2, respectively, immediately before the execution of the executable statement D in which the converted variable is actually used. Accordingly, the process result of the control flow shown in FIG. 19 becomes equivalent to that of the control flow shown in FIG. 18.

The exemplary embodiment of the present invention has been described thus far. As described above, in the present exemplary embodiment, a program is converted by using only commands such as a conditional branch command, an unconditional branch command and an arithmetic command included in a general machine language.

Although the above description has been made about the examples of obfuscation processes for two types of loops, i.e., a while loop and a do-while loop, the method of the present exemplary embodiment can also be applied to the other types of loops. For example, in the case of a pre-test loop (e.g., a for loop) in which loop end determination (i.e., the conditional expression A) is carried out before the execution of a loop process (i.e., the executable statement set B in the loop), the process similar to that performed on the above-described while loop may be applied. On the other hand, in the case of a post-test loop in which loop end determination is carried out after the execution of a loop process, the process similar to that performed on the above-described do-while loop may be applied.

When a plurality of types of loops are included in the obfuscation target program, an obfuscation process for a pre-test loop or an obfuscation process for a post-test loop may be applied for each of the loops in accordance with the type of the loop.

Further, in the above examples, a plurality of executable statements are included in the obfuscation target loop (see FIGS. 6, 12 and 18). However, the process of the foregoing exemplary embodiment can also be applied to a case in which only a single executable statement exists in an obfuscation target loop. In such a case, the conditional branch addition section 14 may convert the single executable statement in the loop into a plurality of executable statements representing a process equivalent to that of this single executable statement. Such a conversion may be performed by adding, to the inside of the loop, a dummy executable statement that does not exert an influence upon the obfuscation target program, for example. Furthermore, in an alternative example, an executable statement "x=c", representing a process for substituting the variable x (this variable x is not used in the obfuscation target program) for the constant c used in the executable statement B in the loop, may be added at the preceding stage of the executable statement B in the loop, thereby replacing the constant c in the executable statement B with the variable x.

Furthermore, in the foregoing exemplary embodiment, neither new statement nor new conditional expression is added to the loop structure in obfuscation. Accordingly, processing overhead incident to obfuscation can be easily predictable. For example, the overhead caused by the process of the example shown in FIG. 2 can be estimated as follows.

First, the number of repeated executions of a while loop is defined as n ($n \geq 1$). In this case, an execution cost Cbefore of the program prior to obfuscation (FIG. 6) is calculated as follows:

$$Cbefore = n(c(A) + c(B1) + c(B2)) + c(A)$$

where c(X) represents an execution cost of a statement X.

On the other hand, an execution cost Cafter of the program after obfuscation (FIG. 7) is calculated as follows:

$$Cafter = (c(A') + c(B1') + c(B2)) + (n-1)(c(A) + c(B1) + c(B2)) + c(A)$$

Accordingly, the execution overhead Cafter−Cbefore can be estimated as follows:

$$Cafter - Cbefore = (c(A') - c(A)) + (c(B1') - c(B1))$$

Thus, the execution overhead caused by the present exemplary embodiment is easily predictable because the execution overhead is constant irrespective of the number of loop structure executions.

In one example, the program obfuscation apparatus 10, which has been described thus far, is implemented by allowing a general-purpose computer to execute a program representing the foregoing process. In the present invention, the computer has, as hardware, for example, a circuit configuration in which a microprocessor such as a CPU, memories (primary storage) such as a random-access memory (RAM) and a read-only memory (ROM), a HDD connected via a HDD (Hard Disk Drive) controller, various I/O (Input/Output) interfaces, etc. are connected to each other via a bus. The bus may be connected with a network interface for connection with a network such as a local-area network. Further, this bus may be connected, via an I/O interface, for example, with devices such as: a disk drive for reading and/or writing data from and/or to a portable disk recording medium such as a CD or DVD; and a memory reader/writer for reading and/or writing data from and/or to a portable non-volatile recording medium of various specifications such as a flash memory. A program, in which processing contents of respective functional modules illustrated above are described, is saved to a fixed storage device such as a hard disk drive and installed on a computer via a recording medium such as a CD or DVD, or via a communication line such as a network. The installed program is read into a RAM and executed by a microprocessor such as a CPU, thereby implementing functions of the program obfuscation apparatus 10 illustrated above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for obfuscating a program, the process comprising:
    detecting a loop from an obfuscation target program;
    adding a conditional expression to the obfuscation target program at a preceding stage of the loop, wherein the conditional expression is neither permanently invalid nor permanently valid; and
    adding a flow in which (a) when a logical value of the conditional expression is false, processing of the obfuscation target program proceeds to a start of the loop, and (b) when the logical value of the conditional expression is true, the processing executes a set of executable statements equivalent to a set of executable statements which are ones from the first executable statement to a middle executable statement among a plurality of executable statements in the loop, and then the processing proceeds to an executable statement subsequent to the middle executable statement in the loop.

2. The computer readable medium according to claim 1, the process further comprising:
    when only a single executable statement exists in the loop, replacing the single executable statement with a plurality of new executable statements equivalent to the single executable statement, wherein
    when the logical value of the conditional expression is true, the adding the flow indicates adding a flow in which the processing executes a set of executable statements equivalent to a set of executable statements which are ones from the first executable statement to a middle executable statement among the plurality of new executable statements, and then the processing proceeds to an executable statement subsequent to the middle executable statement in the loop.

3. The computer readable medium according to claim 1, wherein when a determination conditional expression for determining whether the loop should be continued or not is located at the start of the loop, the adding the conditional expression that is neither permanently invalid nor permanently valid indicates adding at a preceding stage of the loop a conditional expression that is inevitably false when the logical value of the determination conditional expression is false.

4. The computer readable medium according to claim 1, wherein the equivalent executable statement set comprises an expression different from that of the set of executable statements which are ones from the first executable statement to the middle executable statement among the plurality of executable statements in the loop.

5. A program obfuscation method comprising:
detecting, by the at least one processor a loop from an obfuscation target program;
adding, by the at least one processor a conditional expression to the obfuscation target program at a preceding stage of the loop, wherein the conditional expression is neither permanently invalid nor permanently valid; and
adding, by the at least one processor a flow in which (a) when a logical value of the conditional expression is false, processing of the obfuscation target program proceeds to a start of the loop, and (b) when the logical value of the conditional expression is true, the processing executes a set of executable statements equivalent to a set of executable statements which are ones from the first executable statement to a middle executable statement among a plurality of
executable statements in the loop, and then the processing proceeds to an executable statement subsequent to the middle executable statement in the loop.

6. A program obfuscation apparatus comprising:
a hardware detection section that detects a loop from an obfuscation target program; and a hardware addition section that:
(i) adds a conditional expression to the obfuscation target program at a preceding stage of the loop, wherein the conditional expression is neither permanently invalid nor permanently valid and
(ii) adds a flow in which (a) when a logical value of the conditional expression is false, processing proceeds to a start of the loop, and (b) when the logical value of the conditional expression is true, the processing executes a set of executable statements equivalent to a set of executable statements which are ones from the first executable statement to a middle executable statement among a plurality of executable statements in the loop, and then the processing proceeds to an executable statement subsequent to the middle executable statement in the loop.

* * * * *